Patented Oct. 27, 1953

2,657,192

UNITED STATES PATENT OFFICE 2,657,192

POLYMERIZATION OF ACROLEIN

Henry C. Miller, Claymont, and Henry S. Rothrock, Wilmington, Del., assignors to E. I. du Pont de Nemours & Company, Wilmington, Del., a corporation of Delaware No Drawing. Application January 25, 1951,
Serial No. 207,837

6 Claims. (Cl. 260—67)

This invention relates to polymeric materials and more particularly to polymeric acrolein compositions having superior properties and to a novel method for their preparation.

Acrolein has been polymerized, both alone and with other ethylenically unsaturated monomeric compounds capable of undergoing addition polymerization, but the known processes and the polymers produced thereby have possessed certain undesirable characteristics. In the polymerization of acrolein in the presence of peroxide type initiators, insoluble polymers have resulted when acrolein has been polymerized by itself or in mixtures containing more than 10% of acrolein, with other polymerizable unsaturated compounds. Furthermore, even when soluble copolymers containing 10% or less acrolein have been obtained by such methods, they are unstable, i. e., they gel or become insoluble on standing for relatively short periods of time, especially in the presence of air (P. B. Report 20,543 and U. S. Patent 2,416,536). However, attempts at obtaining soluble polymers have been made. One such attempt involved the polymerization of acrolein in the presence of basic catalysts; however, the presence of alkaline materials causes undesirable discoloration in the polymer, and the products possess exceptionally low molecular weights (J. Am. Chem. Soc. 60, 1911–14 (1938), British Patent 141,058 (1928), and French Patent 870,205 (1942)). An alternative method which has been proposed for obtaining soluble acrolein polymers involved the polymerization of acrolein derivatives followed by hydrolysis of the resulting polymeric derivatives to polymers having free aldehyde groups (British Patent 596,620, U. S. Patents 2,467,430 and 2,485,239). This method, which gives soluble polymers, is an indirect one and not economically attractive.

This invention has as an object the preparation of stable, soluble, acrolein polymers, i. e., acrolein polymers resistant to gelation and insolubilization on standing in organic solvents. Other objects will appear hereinafter.

These objects are accomplished by the present invention wherein an acrolein polymer containing at least 5%, but preferably at least 10% acrolein,

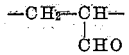

units is prepared with the aid of a free radical type polymerization catalyst, a neutral primary alcohol of not more than ten carbons being added to the reaction mixture prior to gelation thereof, resulting in the formation of a polymer composition containing 0.25 to 50 moles, per mole of combined acrolein, of the primary alcohol and stable, in solution in organic solvents, e. g., dioxane, against gelatinization and insolubilization. These stable polymer compositions are preferably prepared by incorporating the primary alcohol with the acrolein composition to be polymerized. However, in some cases it is possible to add the alcohol to the composition after polymerization, i. e., before substantial gelation or insolubilization takes place.

The word stable as used herein, in connection with soluble acrolein polymers, means that such polymers are resistant to gelation and insolubilization on standing, i. e., they do not gel or become insoluble in organic solvents on storage for long periods of time, even in the presence of air, at ordinary room temperature.

In a preferred embodiment of this invention— one which is essential for the preparation of soluble homopolymers—the acrolein or mixture of acrolein and another ethylenically unsaturated monomeric compound capable of undergoing addition polymerization, preferably a compound having a terminal $CH_2=C<$ group, is placed in a reaction vessel in a solvent containing at least one mole of a neutral primary alcohol, e. g., methanol, ethanol, 1-propanol, and 2-methoxyethanol, per mole of acrolein and, as a polymerization initiator, a catalytic amount of a compound capable of generating free radicals readily under the reaction conditions. In the preparation of soluble homopolymers of acrolein, the total amount of solvent (including both the primary alcohol and any other solvent present) must be at least 60% of the weight of the reaction mixture, except in the case of methanol where the acrolein monomer may constitute 60% of the weight of the reaction mixture. In the preparation of stable copolymers of acrolein, lower proportions of solvent can be used if desired. For example in the preparation of soluble acrolein/vinyl acetate copolymers a quantity of solvent amounting to only 20% of the weight of the combined monomers gives satisfactory results. The air in the free space in the reaction vessel is preferably swept out with an inert gas such as nitrogen or carbon dioxide in order to minimize discoloration of the polymer formed, and the reaction mixture is then maintained at a temperature at which the particular initiator employed generates free radicals readily. In general, polymerization temperatures can range between 0° and 150° C., although temperatures of 25 to 120°

C. are preferred, the higher temperatures generally causing greater discoloration of the polymers. Usually temperatures up to about 75° C. are used with azo type initiators, while temperatures of 60° to 120° C. are usually employed with peroxide type initiators. The polymerization can be carried out at atmospheric or superatmospheric pressure. The time required for any particular action is interdependent on the particular initiator being used and the polymerization temperature being employed. In general, the higher the temperature used, the shorter is the time required. At the completion of the polymerization the polymer is isolated by conventional means. Removal of the solvent by evaporation or by distillation is generally satisfactory. Another method which can be used with polymers which are insoluble in water consists in pouring the reaction mixture into a large volume of water to coagulate the polymer after which the coagulum is separated by filtration and then dried.

In another method—one especially suitable for the stabilization of soluble copolymers of acrolein prepared in the absence of alcohols—a mixture of acrolein and another monomeric compound, ethylenically unsaturated and thereby capable of undergoing addition polymerization, is polymerized in the presence or absence of a solvent, e. g., methyl acetate, benzene, xylene, etc., in the presence of a catalytic amount of a free radical-liberating polymerization initiator at a temperature of 0° to 150° C. under a blanket of an inert gas such as nitrogen or carbon dioxide, and immediately after completion of the polymerization there is incorporated in the reaction mixture at least 0.25 mole of a primary alcohol per mole of acrolein. The presence of this amount of primary alcohol stabilizes, against gelation and insolubilization, the acrolein polymer for long periods of time.

The acrolein used in preparing the polymers of this invention can be the regular grade commercially available. The monomer is redistilled through a short fractionating column just prior to its polymerization in order to remove the polymerization inhibitor which is present in commercial acrolein. Likewise, the other unsaturated monomeric compounds copolymerized with acrolein can be of the regular grades customarily used in addition polymerizations.

The examples below, in which parts are by weight, are illustrative of the invention. The carbonyl number is determined by treating a carbonyl compound with hydroxylamine hydrochloride in pyridine solution and titrating with standard potassium hydroxide solution the free hydrogen chloride liberated. The carbonyl number is expressed as milligrams of potassium hydroxide required per gram of carbonyl compound. Details of this determination are given by Bryant and Smith in J. Am. Chem. Soc. 57, 57 (1935).

Example I

A reaction vessel (capable of withstanding superatmospheric pressure) is charged with 25 parts of acrolein, 70 parts of methanol, 70 parts of benzene and 0.75 part of $\alpha,\alpha'$-azodiisobutyronitrile. The reaction vessel is flushed with nitrogen, sealed, heated and agitated in a water bath at 60° C. for 60 hours. There is obtained by evaporation of the solvent from the reaction mixture 12.5 parts of a light yellow polymer which is soluble in a mixture of acetone and methanol. A portion of this polyacrolein is redissolved in a mixture of 110 parts of acetone with 10 parts of methanol and reprecipitated by pouring the solution into water. This polyacrolein has a carbonyl number of 995.6 (theoretical carbonyl number for polyacrolein is 1,000).

Example II

A pressure reactor is flushed with nitrogen and charged with 25 parts of acrolein, 70 parts of methanol, 70 parts of benzene, and 2 parts of $\alpha,\alpha'$-azodiisobutyronitrile. The reactor is closed and heated with agitation at 85° C. for 24 hours. On removal of the solvent there is obtained 16.5 parts of light yellow, hard acrolein polymer having a carbonyl number of 578.8 and a molecular weight of 1310 (determined ebullioscopically). The polymer is soluble in a mixture of equal parts of methanol and benzene.

Example III

A reaction vessel fitted with a stirrer, thermometer, reflux condenser and nitrogen inlet tube is charged with 168 parts of acrolein, 340 parts of 1-propanol, 420 parts of dioxane and 9 parts of acetyl peroxide. The reaction mixture is carefully blanketed with nitrogen and heated at 65° C. for 18 hours at atmospheric pressure. The solvent is then evaporated, and there is obtained 149 parts of a colorless, hard, brittle polymer. This polyacrolein is soluble in 1-propanol, mixtures of 1-propanol or methanol with benzene, etc.

Example IV

A reaction vessel of the type used in Example III is charged with 58 parts of acrolein, 87 parts of $\beta$-methoxyethanol, 87 parts of dioxane, and 3.16 parts of benzoyl peroxide. The reaction mixture is carefully blanketed with nitrogen and heated at 80–85° C. for eight hours at atmospheric pressure. Removal of the solvent from this reaction mixture by distillation yields 46.5 parts of clear colorless polymer. This polyacrolein is soluble in 1-propanol, methanol-benzene mixtures, etc.

Example V

A pressure reactor is flushed with nitrogen and charged with 10 parts of acrolein, 15 parts of styrene, 70 parts of methanol, 70 parts of benzene, and 0.75 part of $\alpha,\alpha'$-azodiisobutyronitrile. The reactor is closed and heated with agitation at 85° C. for 18 hours. On removal of solvent by evaporation there is obtained 22.3 parts of a light yellow, hard acrolein/styrene (1:1 molar ratio) copolymer having a molecular weight of 3,170, a carbonyl number of 264, and containing 80.42% C and 7.85% H. This polymer is soluble in methanol-benzene, primary alcohol-acetone, primary alcohol-dioxane mixtures, propanol, $\beta$-methoxyethanol, etc.

Example VI

A pressure reactor is flushed with nitrogen and charged with 13.8 parts of acrolein, 11.2 parts of acrylonitrile, 70 parts of methanol, 70 parts of benzene, and 0.75 part of $\alpha,\alpha'$-azodiisobutyronitrile. After heating for 60 hours at 60° C. and removal of solvent by distillation there is obtained 15.6 parts of a copolymer of acrylonitrile and acrolein. This copolymer is soluble in methanol-benzene, methanol-acetone, ethanol, 1-propanol, etc.

Example VII

The process of Example VI is repeated with 11.2 parts of acrolein and 14.8 parts of vinyl acetate substituted for the monomers of that example. At the completion of the reaction, there is obtained 6.6 parts of a copolymer of acrolein with vinyl acetate which is soluble in methanol-acetone (1–10) methanol-cyclohexanone (1–9), primary alcohols having one to four carbon atoms, primary alcohol-benzene mixtures, etc.

*Example VIII*

The process of Example VI is repeated with 10 parts of acrolein and 15 parts of methyl methacrylate substituted for the monomers of that example. At the completion of the reaction, there is obtained 20.2 parts of a copolymer of methyl methacrylate with acrolein which is soluble in the solvents listed in the preceding example.

*Example IX*

The process of Example VI is repeated with 11.2 parts of acrolein and 13.8 parts of methyl acrylate substituted for the monomers of that example. At the completion of the reaction, there is obtained 13 parts of a copolymer of methyl acrylate with acrolein which is soluble in methanol-benzene (1–1), methanol-acetone (1–10), dioxane, etc.

*Example X*

A pressure reactor is swept out with nitrogen and charged with 10 parts of acrolein, 10 parts of butadiene, 60 parts of β-methoxyethanol, and 0.6 part of α,α'-azobis(α,γ-dimethylvaleronitrile). The reactor is closed and heated at 60° C. with agitation for 12 hours. From this reaction mixture there is obtained, after removal of solvent, 10 parts of an amber, viscous copolymer of acrolein with butadiene, which is soluble in methanol-benzene (1:1), methanol, 1-propanol, β-methoxyethanol, etc.

*Example XI*

A reaction vessel is charged with 168 parts of β-allyloxyethanol, 5 parts of benzoyl peroxide and 56 parts of acrolein and the reaction mixture blanketed with nitrogen. The solution is heated at atmospheric pressure for 21 hours at 84–85° C. After removal of the remaining monomeric allyloxyethanol there is obtained 79 parts of a white soluble copolymer of acrolein and β-allyloxyethanol containing 60.52% carbon and 8.06% hydrogen. This copolymer, having a molar ratio of acrolein to β-allyloxyethanol of 4:1, is soluble in primary alcohols, dioxane, acetone, and mixtures of primary alcohols with benzene, dioxane, etc.

*Example XII*

A reaction vessel is charged with 189 parts of 1-propanol, 189 parts of dioxane, 7.5 parts of acetyl peroxide, 56 parts of acrolein and 70 parts of methyl vinyl ketone. After blanketing with nitrogen the reaction mixture is heated at 80–85° C. for three hours and at 60–65° C. for 18 hours. After removal of the solvent by distillation at reduced pressure there is obtained 126 parts of a clear glass-like copolymer of acrolein with methyl vinyl ketone. This copolymer contains 64.22% carbon and 8.86% hydrogen, has a carbonyl number of 458.4, and a molecular weight of 1400. It is soluble in primary alcohols having one to four carbon atoms and in mixtures of these alcohols with benzene, acetone, dioxane, etc.

*Example XIII*

A xylene solution of styrene/acrolein (60/40) copolymer is prepared as follows: A pressure reactor is charged with 18 parts of styrene, 12 parts of acrolein, 0.9 part of α,α'-azodiisobutyronitrile, 140 parts of benzene, and 30 parts of xylene. The reactor is flushed out with nitrogen, sealed and tumbled in a water bath at 60° C. for 65 hours. The resulting reaction mixture containing about 14% solids is concentrated and the benzene removed, by heating on a steam bath at reduced pressure (about 15–25 mm. of mercury). The resulting xylene solution contains 43.8% solids, is clear, slightly yellow in color and has a viscosity at room temperature of 1.83 poises. This solution, even though protected from air at all times, gels in about two weeks at room temperature. To 25 parts of this styrene/acrolein copolymer solution is added one part of methanol. This represents 22.7 weight percent of methanol based on the acrolein content of the copolymer, or 0.4 mole of methanol per mole of acrolein present. This methanol-containing solution has an original viscosity of 1.13 poises and it increases to 4.0 poises on standing three days. The viscosity of the solution then remains substantially constant on further standing. It has a viscosity of 4.53 poises one month later.

In contrast to the good stabilizing effect of methanol on soluble acrolein polymers a large number of anti-oxidants and other additives such as butyraldioxime, hydroquinone, isovaleraldehyde, quinone, m-dinitrobenzene, pyridine, acetic acid, carbon tetrachloride, and 1,1,4,4-tetramethylbutadiene either had no inhibiting effect on the gelation of the above xylene solution of styrene/acrolein (60/40) copolymer or even increased the rate of gelation.

*Example XIV*

A xylene solution of an acrolein/ethyl acrylate/styrene (5/20/75) copolymer containing 24.8% solids is prepared in a manner similar to the copolymer of Example XIII. Concentration to 52.5% solids gives a clear solution having a viscosity of 2.94 poises. Addition of 10%, based on weight of total solids, of β-methoxyethanol (1.47 moles of β-methoxyethanol per mole of acrolein in the copolymer) gives a solution which is stable on storage.

*Example XV*

A reaction vessel fitted with a reflux condenser is charged with a mixture of 950 parts of vinyl acetate, 200 parts of methanol and 80 parts of a 25% (by weight) solution of acetyl peroxide in dimethyl phthalate. The free space in the reaction vessel is flushed out with nitrogen and an atmosphere of nitrogen under a slight pressure (about 0.5 mm.) maintained in the reactor. The reaction mixture is heated to reflux temperature and 20 parts of a mixture of 50 parts of acrolein and 50 parts of methanol is added. After refluxing for one hour the remainder of the acrolein-methanol solution is added dropwise over a period of three hours. Refluxing is continued for a total of 13 hours. The solvent is removed from the reaction mixture by distillation at reduced pressure. The residue is a solid, colorless copolymer of vinyl acetate and acrolein, having an inherent viscosity of 0.32 (measured in 0.5% solution in chloroform at 25° C.), and having a carbonyl number of 20.5. The solid polymer is stable on storage; it remains soluble in solvents

Example XVI

A reaction vessel fitted with thermometer, reflux condenser and nitrogen inlet tube is charged with 5.6 parts of acrolein, 96 parts of the alpha-allyl ether of glycerol and 4.1 parts of acetyl peroxide. The reaction mixture is heated at 70–80° C. for 24 hours. From this reaction there is obtained 38 parts of clear, colorless acrolein/glycerol allyl ether copolymer soluble in primary alcohols and mixtures of primary alcohols and water.

Example XVII

A reaction vessel of the type used in Example XVI is charged with 14 parts of acrolein, 35 parts of glycidyl methacrylate, 1.47 parts of acetyl peroxide, 142 parts of n-propyl alcohol, and 142 parts of dioxane. The reaction mixture is heated at 60–65° C. for 24 hours. The solvent and unreacted monomer is evaporated to leave 36.1 parts of colorless, viscous copolymer of acrolein and glycidyl methacrylate which is soluble in a mixture of n-propyl alcohol and dioxane.

Example XVIII

A reaction vessel of the type used in Example XVI is charged with 14 parts of acrolein, 32.5 parts of hydroxyethyl methacrylate, 1.4 parts of acetyl peroxide, 132 parts of n-propyl alcohol and 132 parts of dioxane. The reaction mixture is heated at 60–65° C. for 24 hours. The solvent is evaporated to leave a colorless resin, a copolymer of acrolein and hydroxyethyl methacrylate, which is soluble in a mixture of n-propyl alcohol and dioxane, and in a mixture of n-propyl alcohol, dioxane and water.

Example XIX

A reaction vessel of the type used in Example XVI is charged with 97 parts of acrolein, 200 parts of allyl glycolate, 15 parts of benzoyl peroxide, 594 parts of n-propyl alcohol and 594 parts of dioxane. The reactants are heated at 75° C. for 12 hours. An additional 5 parts of benzoyl peroxide is added, and heating is continued for 20 hours at 90° C. The solvent is evaporated to leave 136.6 g. of light yellow resin, a copolymer of acrolein and allyl glycolate, which is soluble in n-propyl alcohol and mixtures of n-propyl alcohol with dioxane, benzene, other organic solvents, and water.

Acrolein/vinyl acetate copolymers, e. g., those of Example XV above, may be hydrolyzed to useful products. The hydrolyzed polymers (polyhydroxyaldehydes) prepared from vinyl acetate/acrolein copolymers containing 20% or less acrolein (based on monomer charge) have good solubility in water or water alcohol mixtures and are readily insolubilized when films cast from these solutions are baked at, for example, 60–100° C. with acidic catalysts such as oxalic or citric acid. These copolymers also insolubilize other polyhydroxy compounds such as polyvinyl alcohol or starch when treated in a similar manner. Hydrolyzed polymers containing 3–5% acrolein give films with best water resistance, highest wet strength and prove most effective as wet strength agents for paper and as pigment binders for textiles. The properties vary somewhat with molecular weight, degree of hydrolysis and carbonyl content of the products.

In the general procedure for the hydrolysis of vinyl acetate/acrolein copolymers prepared from monomer mixtures containing from 5–40% acrolein based on monomers one part of polymer dissolved in an equal weight of methanol is added slowly to three to four parts of methanol, at reflux temperature, containing a trace of sodium methoxide. The reaction mixture is refluxed for a total of three to twelve hours with good agitation and additional sodium methoxide added as needed to maintain a reaction mixture basic to phenolphthalein. Hydrolyzed polymers prepared from monomer mixtures containing more than 10% acrolein are swollen and partly dissolved in the reaction mixture. Addition of an equal volume of acetone with stirring precipitates fine powders which are easily separated by filtration. The products are washed with methanol or a mixture of equal parts of acetone and methanol and dried at 40–60° C. under reduced pressure. This is illustrated in Example XX below.

Example XX

To a reaction vessel equipped with a dropping funnel, reflux condenser and mechanical stirrer is added 3200 parts of C. P. methanol and approximately 8 parts of a solution consisting of 7.2 parts of sodium dissolved in 136 parts of C. P. methanol. The solution is heated to reflux temperature and the vinyl acetate/acrolein copolymer of Example XV above (908 parts) dissolved in methanol (725 parts) is added slowly over a seven hour period. The remainder of the sodium methoxide solution is added as needed to maintain the reaction mixture basic to phenolphthalein. The reaction mixture is refluxed with good agitation for an additional four hours, cooled and the fine white product (470 parts) separated by filtration and dried at 40–60° C. under reduced pressure. This product has the following properties: saponification number, 62.0; inherent viscosity at 25° C. at a concentration of 0.2% in water, 0.32.

The examples have illustrated the use of certain neutral primary alcohols in the process of this invention. However, other substituted or unsubstituted, saturated or unsaturated, aliphatic or araliphatic, neutral primary alcohols can be employed when used in a proportion of at least 0.25 mole of the primary alcohol to one mole of acrolein. The presence of neutral substituent groups such as carbonyl, nitrile, ester, ether, halogen, etc., does not, however, interfere with the stabilizing action of the primary hydroxyl group. The primary alcohols used in this invention are neutral alcohols, that is, they are free of substituent groups having basic or acidic reaction. In particular, basic groups such as amino groups must not be present since they cause a different, undesirable type of polymerization to take place, and they may also react with free aldehyde groups to give undesirable products. Examples of other alcohols which can be used include n-butyl alcohol, isobutyl alcohol, n-hexyl alcohol, decyl alcohol, benzyl alcohol, tetrafluoropropanol, ethylene glycol, and β-ethoxyethanol. Unsaturated primary alcohols which are capable of undergoing addition polymerization, e. g., allyl alcohol, serve both as stabilizer and as comonomer in the polymerization of acrolein. Alkanols of one to six carbons and alkoxyalkanols of 3 to 6 carbons are preferred.

When less than one mole of primary alcohol per mole of acrolein is used in free radical initiated polymerization systems for the preparation of homopolymers, the products obtained are insoluble in organic solvents. Insoluble homopolymers of acrolein are also obtained when secondary or tertiary alcohols are substituted for primary alcohols. Thus, when acrolein is polymerized in dioxane solution (in the absence of a primary alcohol) in the presence of α,α'-azodiisobutyronitrile as initiator at 60° C. for 12 hours, a hard white polymer is formed which is insoluble in common organic solvents. Similarly, insoluble homopolymers of acrolein are formed when solvents such as benzene, tertiary butyl alcohol, acetone, ethyl acetate and water are used.

When the primary alcohol is added to a soluble acrolein copolymer prepared in the absence of a primary alcohol to stabilize the polymer, smaller proportions of the primary alcohol are effective. In this case, the amount of primary alcohol must be at least 0.25 mole per mole of acrolein in the copolymer.

In addition to the copolymers specifically mentioned in the examples soluble copolymers of acrolein with other ethylenically unsaturated compounds capable of undergoing addition polymerization can be prepared by the process of this invention. Further such copolymerizable unsaturated compounds which can be used include isobutylene, allyl alcohol, allyl glycidyl ether, glycerol α-allyl ether, vinyl methyl ether, allyl glycolate, methyl allyloxyacetate, allyloxyacetic acid, vinylpyridines, glycidyl methacrylate, hydroxyethyl methacrylate, lauryl methacrylate, isobutyl methacrylate, methacrylonitrile, and alkyl maleates. Copolymers of acrolein with ethylenically unsaturated compounds are soluble in common organic solvents, e. g., dioxane. If desired, mixtures of two or more ethylenically unsaturated monomers can be copolymerized with acrolein. The proportions of the different comonomers used in the process of this invention can be varied over wide limits. The monomer composition can be composed of from 5 to 100% acrolein with the remainder one or more other ethylenically unsaturated compounds subject to addition polymerization by reason of the ethylenic bond. Polymerizable vinylidene compounds, i. e., compounds having a terminal $CH_2=C<$ group are preferred.

The solubility of the copolymers in dioxane, or other inert organic solvent, will vary from copolymer to copolymer, depending on the particular comonomer with which acrolein is polymerized and on the proportion of the comonomer. In cases where the homopolymer of the comonomer is insoluble in dioxane, it is desirable to use larger proportions of acrolein to obtain a practical degree of solubility of the polymer in dioxane. In such cases, at least 40% of acrolein is preferred. However, regardless of the composition of the copolymer, the use of primary alcohols gives products having good solution stability whereas similar compositions containing no alcohol are unstable.

The inert solvents which can be used in the polymerization of acrolein are not limited to those specifically mentioned in the examples. Useful solvents or diluents which can be used in combination with primary alcohols include the following: hydrocarbons, e. g., toluene, xylene, and n-octane; ethers, e. g., di-n-butyl ether; esters, e. g., methyl acetate; aliphatic halides, e. g., ethylene dichloride, and water (in small proportions, i. e., less than 25% of the weight of the total reaction mixture).

Free radical-generating compounds, i. e., compounds which generate free radicals under polymerizing conditions, which are especially suitable for use as initiators in the polymerization of acrolein include the organic peroxides and the azo compounds of the types disclosed in U. S. Patent 2,471,959. Specific peroxides which can be used include dialkyl peroxides, e. g., di-t-amyl peroxide; alkyl hydroperoxides, e. g., t-butyl hydroperoxide; and diacyl peroxides, e. g., benzoyl peroxide, acetyl peroxide, and acetyl benzoyl peroxide. Specific azo compounds, in addition to those mentioned in the examples, which can be used include α,α'-azodiisobutyramide, 1,1'-azodicyclohexanecarbonitrile and α,α'-azobis(α,γ-dimethylvaleronitrile). The concentration of free radical-generating initiator used in the preparation of acrolein polymers can be varied over wide limits, amounts ranging from 0.1% to 10% of the weight of the polymerizable materials being operable. Preferably from 2% to 7% of the peroxide type and azo type initiators are employed since these give practical rates of polymerization.

In the preparation of soluble homopolymers of acrolein, the proportion of primary alcohol in relation to the acrolein present, and the concentration of acrolein in the polymerization system must both be held within the critical limits specified previously, i. e., at least 1.0 mole of alcohol per mole of acrolein and not more than 60% by weight of monomeric acrolein if methanol is used as cosolvent, and not more than 40% by weight of monomeric acrolein if a higher primary alcohol is used as the solvent or cosolvent, in order to obtain soluble homopolymers. More specifically, if only 0.935 mole of β-methoxyethanol, per mole of acrolein in the polymerization system, is used, an insoluble polymer results. Likewise, if the total polymerization system contains more than 40% acrolein (60% when methanol is used as a solvent), the homopolymer formed is insoluble. When primary alcohols having more than two carbon atoms are employed, it is necessary that the acrolein concentration in the polymerization system be less than 40%, and preferably from 15% to 30%, in order to obtain soluble homopolymers.

In the preparation of soluble homopolymers of acrolein, the problem of stability is a major one, and primary alcohols have been found to be unusually effective stabilizers for such polymers. However, secondary and tertiary alcohols have some stabilizing effect on copolymers of acrolein, particularly on those containing small proportions of acrolein. For example, copolymers of acrolein and vinyl acetate containing 5% to 20% acrolein (by weight) prepared in the presence of isopropyl alcohol are soluble in organic solvents and are stable on storage. Likewise, copolymers of acrolein and vinyl acetate containing 5% acrolein prepared in the presence of tertiary-butyl alcohol are soluble in organic solvents, and they possess higher molecular weights than copolymers prepared in the presence of isopropyl or methyl alcohols.

The compositions of this invention are essentially neutral. Conditions of slight acidity are not harmful; however, alkaline conditions are undesirable because of the tendency of alkaline materials to catalyze the different condensation-type polymerization of acrolein to undesirable types of polymers.

The polymeric acrolein compositions of this invention possess a number of properties which make them superior to acrolein polymer compositions produced by methods hitherto known.

For example, the acrolein polymers prepared in systems containing a primary alcohol are soluble in common organic solvents, they have higher molecular weights than the hitherto known acrolein polymers, and they also contain higher proportions of free aldehyde groups. Polymers prepared in this way also possess good light and heat stability, e. g., films of the polymers remain clear and colorless after being heated to 150° C. for 30 minutes. Furthermore, acrolein homopolymers prepared in the presence of primary alcohols and free radical-yielding initiators do not yield acrolein on pyrolysis. Homopolymers prepared in the presence of a primary alcohol, and copolymers prepared in other solvents but in which a primary alcohol has been incorporated immediately after polymerization, possess improved stability toward gelation and remain soluble in organic solvents, e. g., dioxane, for relatively long periods of time.

The improved properties possessed by the polymeric acrolein compositions of this invention make them especially useful in various applications. The polymers are particularly useful as chemical intermediates. For example, they react with amines to yield aldehyde-amine derivatives, they react with hydroxyl groups to form acetals and with sodium bisulfite to give water soluble addition compounds from which the aldehydes may be regenerated with either acid or alkali. The polymers are also effective crosslinking agents for polyvinyl alcohol, the acrolein copolymers being especially useful for this purpose. The polymers are also useful as leather tanning agents; crosslinking agents for alkyd resins; modifiers for papers, adhesives, textiles, fibers, films, fabrics, gelatins, etc.; as binding resins in the pigment-printing of textiles and as binding resins for nonwoven fabrics. In the last-mentioned application, copolymers of acrolein with β-allyloxyethanol in which the mole ratio of acrolein to allyloxyethanol is 1:1.5 are the most effective binders. The resins are applied to viscose rayon felt as a 20–35% solution in n-propyl alcohol containing citric acid as a catalyst. Following a 15 to 20 minute cure at 140–160° C. the resulting nonwoven fabrics withstand boiling in an "Ivory" soap-sodium carbonate solution for one hour, and steaming at 115° C. for 15 minutes.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of acrolein polymers soluble and stable in dioxane and containing recurring acrolein, $C_3H_4O$, units in amount at least 5% by weight of the polymer which comprises polymerizing a monomeric composition consisting of monomers containing, as their sole carbon to carbon unsaturation, a single terminal $CH_2=C<$ group and thereby subject to addition polymerization and containing at least 5% by weight of acrolein, $CH_2=CH-CHO$, with the aid of a catalytic amount of a free radical producing, free radical addition polymerization initiating material in the presence of at least one mole, per mole of acrolein, of a neutral primary alcohol of not more than ten carbons.

2. A process for the preparation of acrolein polymers soluble and stable in dioxane and containing recurring acrolein, $C_3H_4O$, units in amount at least 10% by weight of the polymer which comprises polymerizing a monomeric composition consisting of monomers containing, as their sole carbon to carbon unsaturation, a single terminal $CH_2=C<$ group and thereby subject to addition polymerization and containing at least 10% by weight of acrolein, $CH_2=CH-CHO$, with the aid of a catalytic amount of a free radical producing, free radical addition polymerization initiating material in the presence of at least one mole, per mole of acrolein, of a neutral primary alcohol of not more than ten carbons.

3. A process for the preparation of acrolein homopolymers soluble and stable in dioxane which comprises polymerizing acrolein, $$CH_2=CH-CHO$$

in the presence of at least one mole, per mole of acrolein, of a primary neutral alcohol free from aliphatic unsaturation and having the hydroxy group as its only reactive group in an inert solvent and with the aid of a catalytic amount of a free radical producing, free radical addition polymerization initiating material.

4. A process for the preparation of acrolein homopolymers soluble and stable in dioxane which comprises polymerizing acrolein, $$CH_2=CH-CHO$$

in the presence of at least one mole of methanol, per mole of acrolein, in an inert solvent, and with the aid of a catalytic amount of a free radical producing, free radical addition polymerization initiating material.

5. A process for the preparation of an acrolein polymer which comprises polymerizing acrolein, $CH_2=CH-CHO$, with at least one mole, per mole of acrolein, of allyloxyethanol and with the aid of a catalytic amount of a free radical producing, free radical addition polymerization initiating material.

6. A product of the polymerization of acrolein in the presence of at least one mole, per mole of acrolein, of allyloxyethanol, said product giving on pyrolysis only products free of monomeric acrolein, said product being of a molecular weight of at least 1400, soluble in dioxane, resistant to gelation in such solution and having from 0.1 to 3 allyloxyethanol, $$-CH_2-CH-$$
$$\phantom{-CH_2-}|$$
$$\phantom{-CH_2-}CH_2OCH_2CH_2OH$$

units per acrolein, $C_3H_4O$, unit in the polymer.

HENRY C. MILLER.
HENRY S. ROTHROCK.

References Cited in the file of this patent

UNITED STATES PATENTS

| Number | Name | Date |
|---|---|---|
| 2,071,419 | Moss | Feb. 23, 1937 |
| 2,212,894 | Allen | Aug. 27, 1940 |
| 2,378,195 | D'Alelio | June 12, 1945 |
| 2,462,680 | Sargent | Feb. 22, 1949 |
| 2,478,154 | Evans | Aug. 2, 1949 |
| 2,485,239 | Izard | Oct. 18, 1949 |

FOREIGN PATENTS

| Number | Country | Date |
|---|---|---|
| 870,205 | France | Mar. 5, 1942 |

OTHER REFERENCES

Gilbert et al., Journ. Amer. Chem. Soc., vol. 60, 1938, pp. 1911 to 1914.

Izard, Ind. and Eng. Chem., vol. 42, No. 10, October 1950, pp. 2108 to 2110.